United States Patent
Furumoto et al.

(10) Patent No.: US 9,767,799 B2
(45) Date of Patent: Sep. 19, 2017

(54) VOICE RECOGNITION SYSTEM AND RECOGNITION RESULT DISPLAY APPARATUS

(71) Applicant: MITSUBISHI ELECTRIC CORPORATION, Tokyo (JP)

(72) Inventors: Yuki Furumoto, Tokyo (JP); Yuki Yamashita, Tokyo (JP); Yuzuru Inoue, Tokyo (JP); Masanobu Osawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/777,180

(22) PCT Filed: May 21, 2013

(86) PCT No.: PCT/JP2013/064072
§ 371 (c)(1),
(2) Date: Sep. 15, 2015

(87) PCT Pub. No.: WO2014/188512
PCT Pub. Date: Nov. 27, 2014

(65) Prior Publication Data
US 2016/0035352 A1  Feb. 4, 2016

(51) Int. Cl.
*G10L 15/22* (2006.01)
*G01C 21/36* (2006.01)
*G06F 3/16* (2006.01)

(52) U.S. Cl.
CPC .......... *G10L 15/22* (2013.01); *G01C 21/3608* (2013.01); *G06F 3/167* (2013.01); *G10L 2015/221* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 7,146,323 | B2* | 12/2006 | Guenther | G06F 3/167 704/275 |
| 9,075,514 | B1* | 7/2015 | Karakotsios | G06F 3/04842 |
| 9,223,461 | B1* | 12/2015 | Brown | G06F 3/0482 |
| 2002/0062216 | A1* | 5/2002 | Guenther | G06F 3/167 704/270.1 |

(Continued)

FOREIGN PATENT DOCUMENTS

| | | |
|---|---|---|
| JP | 2005-311883 A | 11/2005 |
| JP | 2008-14818 A | 1/2008 |
| WO | WO 2006/067855 A1 | 6/2006 |

*Primary Examiner* — Douglas Godbold
(74) *Attorney, Agent, or Firm* — Birch, Stewart, Kolasch & Birch, LLP

(57) ABSTRACT

A voice recognition system, when deciding that a user is about to select a voice recognition result displayed on a screen while the system continuously recognizes a voice uttered, stops a display update of the recognition result on the display unit, thereby being able to prevent the recognition result from disappearing or from changing to other recognition result at the moment when the user is about to select the recognition result. This makes it possible to prevent a user from carrying out an unwanted operation, and to improve the convenience of the user.

16 Claims, 10 Drawing Sheets

(56) References Cited

U.S. PATENT DOCUMENTS

| | | | |
|---|---|---|---|
| 2003/0191629 A1* | 10/2003 | Yoshizawa | G10L 15/22 704/10 |
| 2008/0109164 A1 | 5/2008 | Matsunaga et al. | |
| 2009/0122007 A1* | 5/2009 | Tsuzaki | G06F 3/0412 345/156 |
| 2010/0229116 A1* | 9/2010 | Murase | G01C 21/3608 715/810 |
| 2011/0109577 A1* | 5/2011 | Lee | G06F 3/044 345/173 |
| 2013/0007658 A1* | 1/2013 | Loughlin | G06F 3/0483 715/810 |
| 2014/0214430 A1* | 7/2014 | Wang | G10L 21/10 704/275 |
| 2014/0258932 A1* | 9/2014 | Cho | G06F 3/0485 715/825 |
| 2014/0303975 A1* | 10/2014 | Ohmura | G06F 3/167 704/235 |
| 2015/0331664 A1* | 11/2015 | Osawa | G01C 21/3608 704/275 |
| 2016/0041752 A1* | 2/2016 | Kimura | G06F 3/04886 345/173 |

* cited by examiner

VOICE RECOGNITION SYSTEM AND RECOGNITION RESULT DISPLAY APPARATUS

TECHNICAL FIELD

The present invention relates to a voice recognition system that recognizes a voice uttered by a user and displays a recognition result, a recognition result display apparatus that displays a recognition result of a voice, and a display method that causes a display device to display the recognition result.

BACKGROUND ART

As a voice recognition method, a method is known which recognizes a voice uttered by a user and displays a recognition result.

For example, a Patent Document 1 describes a voice recognition system that recognizes a voice uttered by a user and displays a recognition result. When the user utters a voice, it displays a shortcut button representing the recognition result of the voice near the lower left corner on a screen, and executes a shortcut function in response to the push of the shortcut button by the user.

PRIOR ART DOCUMENT

Patent Document

Patent Document 1: Japanese Patent Laid-Open No. 2008-14818.

DISCLOSURE OF THE INVENTION

Problems to be Solved by the Invention

However, the conventional voice recognition system disclosed in the Patent Document 1, for example, has the following problem. When a user gives a new utterance during display of a shortcut button, it can erase the previous shortcut button displayed to display the new recognition result. Accordingly, at the moment when the user is about to select the desired recognition result, the button moves or disappears, and is changed to a button corresponding to other recognition result, resulting in an operation the user does not want.

The present invention is implemented to solve the foregoing problem. Therefore it is an object of the present invention to provide a voice recognition system capable of enabling a user to select a desired recognition result, and to provide a recognition result display apparatus and a display method causing a display device to display the recognition result without updating the recognition result when the user is about to select the recognition result displayed on the screen.

Means for Solving the Problems

To accomplish the foregoing object, the present invention comprises, in a voice recognition system that recognizes a voice uttered by a user and displays a recognition result, a voice acquirer that detects and acquires the voice uttered by the user; a voice recognition unit that recognizes voice data acquired by the voice acquirer by referring to a voice recognition dictionary and outputs a recognition result continuously while the voice recognition system is in operation; an operating button generator that generates an operating button with a function corresponding to the recognition result output by the voice recognition unit; a display that displays the operating button generated by the operating button generator; a display controller that controls display contents of the operating button on the display; and an operating button display update stop/restart unit that outputs an instruction signal that instructs the display controller to stop and restart an update of the display contents of the operating button depending on whether the user is about to touch the operating button displayed on the display or not, wherein the operating button display update stop/restart unit outputs an instruction signal for stopping the update of the display contents of the operating button when deciding that the user is about to touch the operating button displayed on the display; and the display controller instructs the display to stop a display update of the operating button displayed on the display when receiving the instruction signal for stopping the update of the display contents of the operating button from the operating button display update stop/restart unit.

Advantages of the Invention

According to the present invention, the voice recognition system prevents the display unit from carrying out the display update of the recognition result when it decides that the user is about to select the recognition result displayed on the screen. Accordingly, it can prevent the recognition result from disappearing or being changed to other recognition result at the moment when the user is about to select the recognition result, and can prevent the occurrence of the operation a user does not want, thereby being able to improve the convenience of the user.

BEST MODE FOR CARRYING OUT THE INVENTION

The best mode for carrying out the invention will now be described with reference to the accompanying drawings.

The present invention relates to a voice recognition system that recognizes a voice uttered by a user. As long as the voice recognition system is in operation, it continuously recognizes a voice. Incidentally, in the following embodiments, although an example will be described which applies the voice recognition system in accordance with the present invention to a navigation system mounted in a moving body such as a vehicle, it is also applicable to a navigation system for a moving body other than a vehicle, and can be applied to a server of a navigation system. In addition, it is also applicable to applications of a navigation system installed in a mobile data terminal such as a smartphone, tablet PC, and mobile phone.

Embodiment 1

Figure 1:
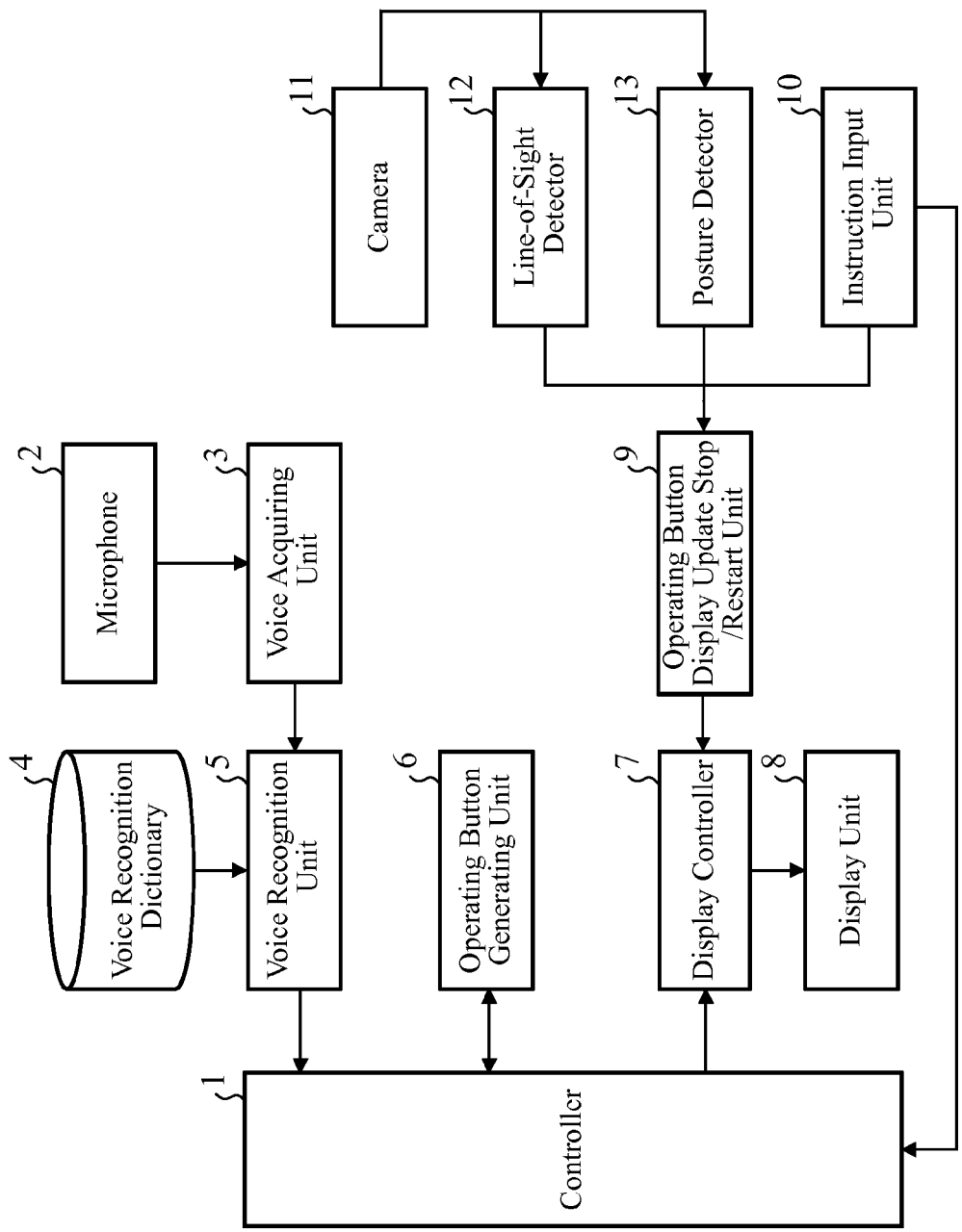
FIG. 1 is a block diagram showing an example of a voice recognition system of an embodiment 1.

FIG. 1 is a block diagram showing a configuration of a voice recognition system of an embodiment 1 in accordance with the present invention. The voice recognition system comprises a controller 1, a microphone 2, a voice acquiring unit 3, a voice recognition dictionary 4, a voice recognition unit 5, an operating button generating unit 6, a display controller 7, a display unit 8, an operating button display update stop/restart unit 9, an instruction input unit 10, a camera 11, a line-of-sight detector 12, and a posture detector 13.

The microphone 2 acquires (collects) a voice uttered by a user. As the microphone 2, for example, there is an omnidirectional (or nondirectional) microphone, an array microphone which consists of an array of a plurality of omnidirectional (or nondirectional) microphones to make it possible to control its directivity, and a unidirectional microphone which has directivity in one direction and cannot control its directivity.

The voice acquiring unit 3 captures a user utterance acquired with the microphone 2, that is, the input voice, and carries out A/D (Analog/Digital) conversion using PCM (Pulse Code Modulation), for example.

The voice recognition unit 5 detects a voice active section corresponding to the contents of the utterance of the user from the voice signal digitized by the voice acquiring unit 3, extracts features of the voice data in the voice active section, and executes recognition processing based on the features using the voice recognition dictionary 4, thereby outputting a recognition result. Incidentally, as for the recognition processing, a general method such as an HMM (Hidden Markov Model) can be used.

By the way, as for the voice recognition function in a car navigation system or the like, it is common for a user to specify (instruct) a start of the utterance for the system. Therefore, a button (referred to as a "voice recognition start instruction unit" from now on) for instructing a voice recognition start is displayed on the touch screen or is provided on the steering wheel. Then, after the user pushes down the voice recognition start instruction unit, the system starts recognizing the voice uttered. More specifically, the voice recognition start instruction unit outputs a voice recognition start signal, and after receiving the signal, the voice recognition unit detects the voice active section corresponding to the user utterance from the voice data acquired by the voice acquiring unit, and executes the recognition processing described above.

The voice recognition unit 5 of the present embodiment 1, however, continues to recognize the contents of the user utterance even if the voice recognition start instruction is not given by the user. More specifically, even if the voice recognition unit 5 does not receive the voice recognition start signal, the voice recognition unit 5 continues, as long as the navigation system incorporating the voice recognition system is in operation, to repeatedly execute the processing that detects the voice active section corresponding to the contents the user utters from the voice data acquired by the voice acquiring unit 3, extracts the features of the voice data in the voice active section, executes the recognition processing based on the features using the voice recognition dictionary 4, and outputs a voice recognition result. This is the same in the following embodiments.

The instruction input unit 10 is a component for receiving an instruction manually input by a user, that is, for accepting instructions of various operations by a user. As the instruction, there is an instruction from a hardware switch provided on the navigation system, from a touch switch (including an operating button which will be described later) set and displayed on the display unit 8, from a remote control provided on the steering wheel or the like, or from a recognition apparatus that recognizes an instruction by a separate remote control.

The operating button generating unit 6 generates an operating button with a function corresponding to the recognition result output from the voice recognition unit 5.

The display controller 7 controls the display update of the operating button by outputting an instruction such as for displaying the operating button generated by the operating button generating unit 6 on the display unit 8, altering the display position of the operating button, and deleting the operating button that has been displayed for a prescribed time period; and decides whether the display update of the operating button on the display unit 8 is stopped or not. In addition, it manages the information about an operating button displayed on the display unit 8 such as an operating button name and the display position of an operating button on the display unit 8.

The display unit 8 is an integrated display type touch screen which comprises an LCD (Liquid Crystal Display) and a touch sensor, for example, and carries out drawing on the screen in response to an instruction of the display controller 7. Incidentally, as the touch screen, it is possible to use any one of the pressure-sensitive type, electromagnetic induction type, capacitance type, and combination of them. In addition, the LCD can be replaced by an organic electroluminescence display.

The controller 1 controls the operations of the whole voice recognition system. In addition, it executes various functions in response to the instructions from a user input via the instruction input unit 10 or to the recognition result output from the voice recognition unit 5. For example, when a user selects the operating button (recognition result) displayed on the display unit 8 manually or by a voice, it executes the function assigned to the operating button selected.

In the following description, it is assumed that the voice recognition unit 5 continuously recognizes a genre name (referred to as a facility genre name from now on) to which facilities belong such as a "gas station" and "convenience store" from a user utterance, and outputs a recognition result, and that the operating button generating unit 6 generates an operating button with a function of retrieving facilities belonging to the recognition result (referred to as "genre retrieval function" from now on).

Figure 2:
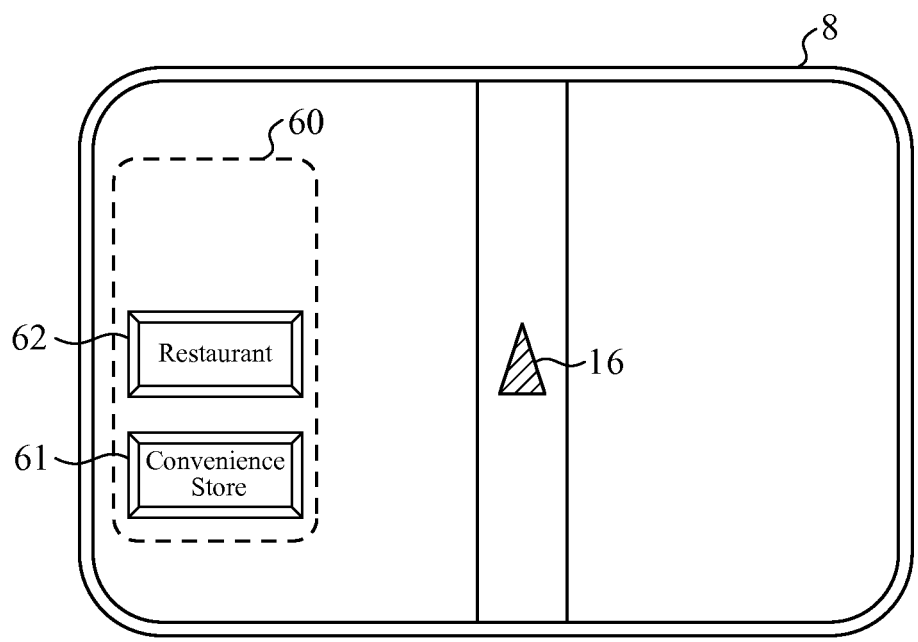
FIG. 2 is a diagram showing a screen example on which operating buttons are displayed in an operating button display area of a display unit.

The operating button is displayed in a prescribed area of the display unit 8 (referred to as an "operating button display area" from now on) by the display controller 7 such as operating buttons 61 and 62 in FIG. 2.

FIG. 2 is a diagram showing an example of the screen which displays the operating buttons 61 and 62 in an operating button display area 60 of the screen (display unit 8) displaying a map and the like. If the user selects the operating button 61 or 62, the controller 1 executes the genre retrieval corresponding to the operating button selected. Incidentally, it is assumed that the voice recognition unit 5 executes facility genre name recognition using keyword spotting which is a well-known technique.

Incidentally, instead of the facility genre name recognition using the keyword spotting, a method can also be used which carries out all the recognition by the large vocabulary continuous speech recognition, and extracts facility genre names by morphological analysis of the recognition result.

In addition, the voice recognition unit 5 can recognize an artist name, album name, title of a piece and a command for operating the car navigation system, for example. In this case, as for the function assigned to the operating button, it can be a function of retrieving a piece by an artist name, album name or title of the piece, or a function corresponding to the command, for example.

Here, an example of a display update method of an operating button on the display unit 8 by the display controller 7 will be described by providing an concrete instance.

Figure 3:
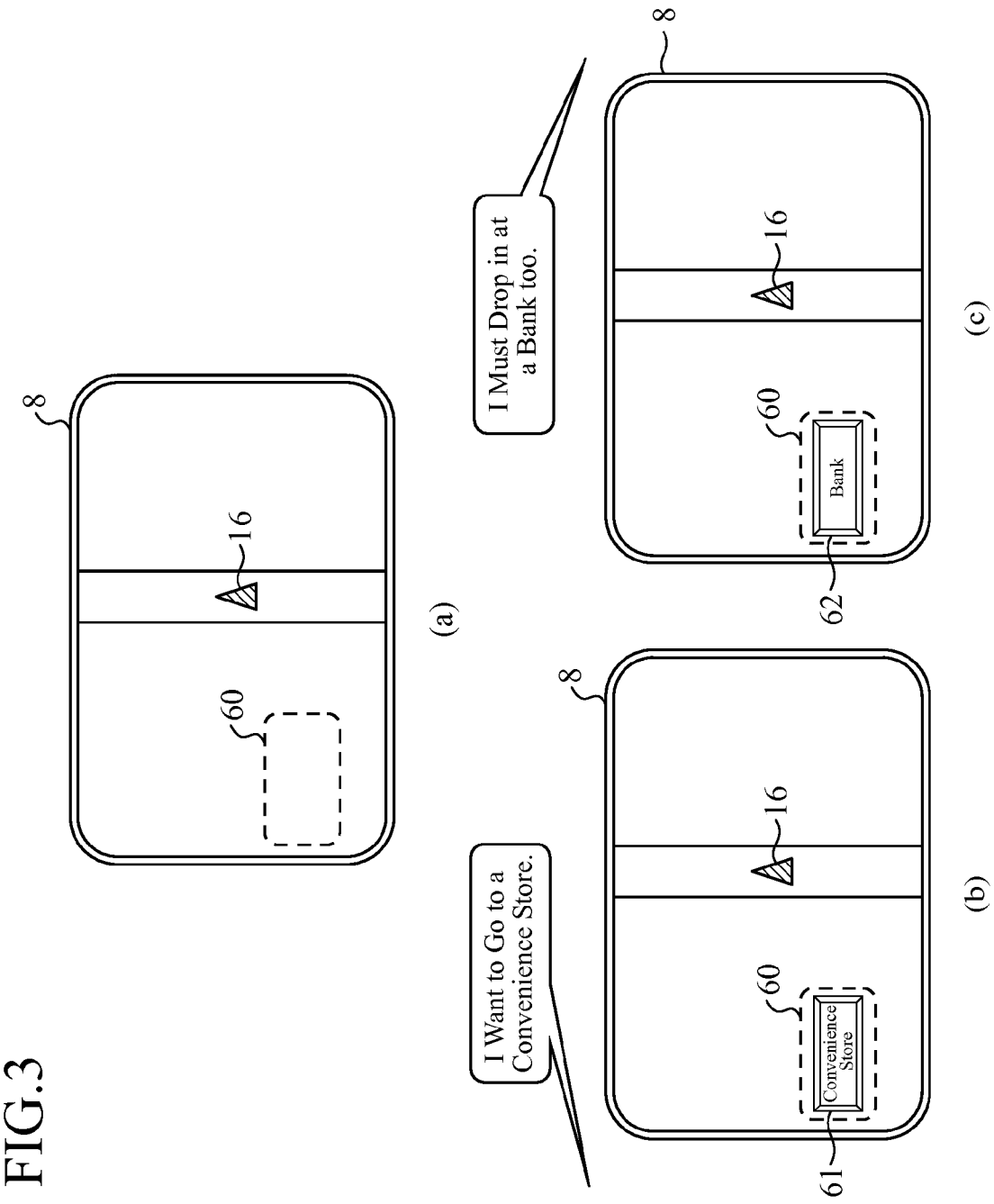
FIG. 3 is a diagram showing a display update method of an operating button when the operating button display area can display only one operating button.

FIG. 3 is a diagram showing a display update method of an operating button when the operating button display area 60 is small and can display only one operating button.

FIG. 3(*a*) shows a state in which no operating button is displayed in the operating button display area 60. If an utterance "I want to go to a convenience store" is recognized in this state, for example, an operating button corresponding to the "convenience store" is generated, and the display controller 7 outputs an instruction to the display unit 8 to display the operating button 61 (FIG. 3(*b*)).

After that, if an utterance "I must drop in at a bank" is recognized, and when an operating button corresponding to the "bank" is generated, the display controller 7 outputs to the display unit 8 the instruction to erase the "convenience store" operating button 61 and to display the "bank" operating button 62 (FIG. 3(*c*)). In addition, either a new operating button is generated or not, the display controller 7 outputs the instruction to erase the operating button which has been displayed for a prescribed time period from a display start without any operation for the operating button displayed.

In addition, as another display update method, a case will be described in which the operating button display area 60 can display a plurality of operating buttons (two operating buttons are assumed in the description with reference to FIG. 4).

Figure 4:
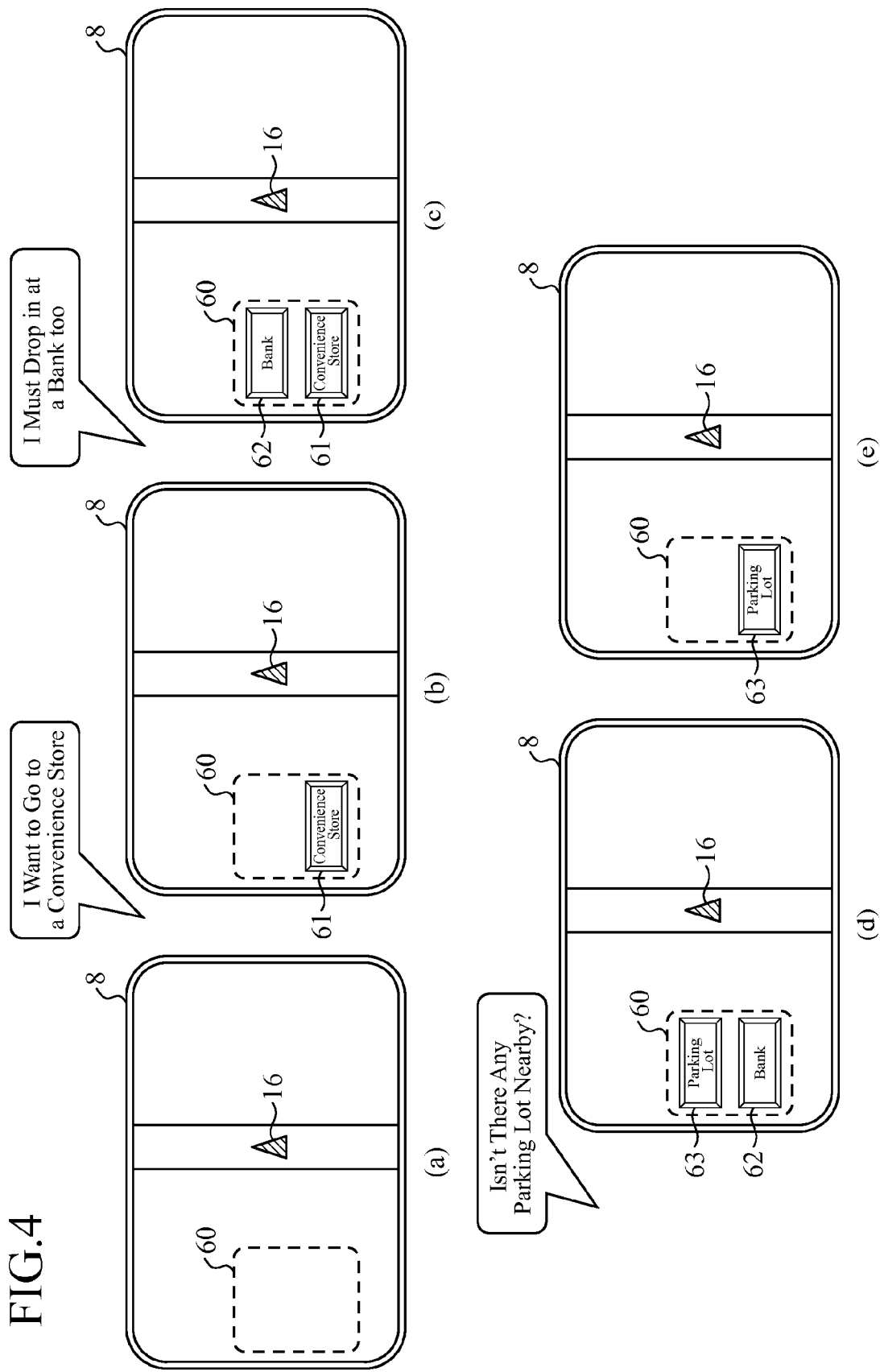
FIG. 4 is a diagram showing a display update method of an operating button when the operating button display area can display two operating buttons.

FIG. 4 is a diagram showing a display update method of the operating buttons, in which the operating button display area 60 can display two operating buttons.

If an utterance "I want to go to a convenience store" is recognized as in the previous example in a state where no operating button is displayed (FIG. 4(*a*)), and the operating button corresponding to the "convenience store" is generated, the display controller 7 outputs an instruction to display the operating button 61 to the display unit 8 (FIG. 4(*b*)).

After that, if an utterance "I must drop in at a bank" is recognized, and an operating button corresponding to the "bank" is generated, the display controller 7 outputs an instruction to display the operating button 62 to the display unit 8 (FIG. 4(*c*)). Furthermore, if an utterance "Is there any parking lot nearby?" is recognized, an operating button corresponding to the "parking lot" is generated, and the display controller 7 deletes the operating button that has been displayed for the longest time, that is, the "convenience store" operating button 61 here, shifts the "bank" operating button 62 to the place the "convenience store" operating button 61 has been displayed, and outputs the instruction to the display unit 8 to additionally displays the "parking lot" operating button 63 (FIG. 4(*d*)).

In addition, even if a new operating button is not generated, the display controller 7 outputs an instruction to erase the operating button which has been displayed for a prescribed time period from the display start without any operation to the operating button displayed. FIG. 4(*e*) shows a state in which when the prescribed time period has elapsed from the display of the "bank" operating button 62 without any operation to the "bank" operating button 62, the "bank" operating button 62 is deleted, and the "parking lot" operating button 63 is shifted to the place where the "bank" operating button 62 has been displayed.

Incidentally, it goes without saying that the foregoing display update method is only an example, and other display update methods are possible.

For example, when an operating button is displayed in the operating button display area 60 in FIG. 4, although a first operating button is displayed at the bottom of the operating button display area 60, it can be displayed from the top.

In addition, until the number of operating buttons exceeds the maximum number to be displayed, that is, when a second operating button is displayed after the first operating button has been displayed in FIG. 4, although the location of the first operating button 61 is maintained and the second operating button 62 is displayed additionally at the top as shown in FIG. 4(*c*), a configuration is also possible in which a new operating button is always displayed at the bottom. In this case, when shifting from FIG. 4(*b*) to FIG. 4(*c*), the first "convenience store" operating button 61 is shifted upward, and the second "bank" operating button 62 is displayed at the bottom newly.

Here, a method will be described of deciding whether a state is kept or not without any operation to the operating button displayed, that is, whether a user is about to push an operating button or not. The decision is made by the operating button display update stop/restart unit 9.

As a method of deciding whether a user is about to push an operating button or not, a variety of methods are conceivable. However, it is assumed here that one of the following methods is used: a method of deciding by detecting a line of sight of a user with the line-of-sight detector 12; a method of deciding by detecting a prescribed posture of a user by using the posture detector 13; and a method of deciding by that a user performs a prescribed operation using the instruction input unit 10.

The line-of-sight detector 12 detects the line of sight of the user directed to the display unit 8 by analyzing an image taken with the camera 11. Here, the line-of-sight detector 12 can detect the line of sight directed to a particular area on the display unit 8 such as the operating button display area 60 in the examples of the screen shown in FIG. 2-FIG. 4. Incidentally, as for the method of detecting the line of sight, since a publicly known technique can be used, its description will be omitted here.

The posture detector 13 detects a prescribed posture of the user who is about to push the operating button displayed on the display unit 8 by analyzing an image taken with the camera 11. Here, the prescribed posture in which the user is about to push the operating button includes such postures as an arm of the user is directed to the display unit 8, the upper half of the user's body is directed to the display unit 8, and the body of the user bends forward. Incidentally, as for a method of detecting the posture, since a publicly known technique is applicable, its description will be omitted here.

Then, when deciding that the prescribed condition is satisfied, that is, when the operating button display update stop/restart unit 9 decides that the user is about to push the operating button by deciding whether the user is about to push the operating button or not from a detection result of the line-of-sight detector 12, posture detector 13, or instruction input unit 10, it outputs an instruction to stop the display update of the operating button to the display controller 7.

Here, if it decides that the prescribed condition is satisfied, that is, if it decides that the user is about to push the operating button, and more specifically, if the line-of-sight detector 12 detects the line of sight of the user to the display unit 8, or the posture detector 13 detects the prescribed posture in which the user is about to push the operating button, or the instruction input unit 10 receives the prescribed operation which indicates that the user is about to push the operating button, the operating button display update stop/restart unit 9 outputs to the display controller 7 an instruction signal for stopping an update of the display contents of the operating button.

The case where the instruction input unit 10 carries out the prescribed operation refers to the following cases, for example: where a prescribed button of a remote control or a steering switch (such as a display stop button or switch) is pushed down; and where when a touch sensor is a type such as a proximity sensor of a capacitance type, which can detect a finger of the user or approach of other object, an object such as a finger of the user approaches the touch sensor within a distance not greater than a prescribed value.

In addition, in the case of a touch sensor (when comprising a proximity sensor), a configuration is also possible in which the operating button display update stop/restart unit 9 acquires approaching information of an object from the touch sensor, calculates the distance between the object such as a finger of the user and the touch sensor (proximity sensor), and outputs the instruction to stop the display update when the distance calculated is not greater than the prescribed value (or less than the prescribed value).

Here, a configuration is also possible which acquires information about the position on the touch screen of the object approaching the touch screen from the touch sensor, and outputs the instruction to stop the display update when the position is within the operating button display area 60 of FIG. 2, for example, and when the distance between the object and touch screen is not greater than the prescribed value (or less than the prescribed value).

Incidentally, although the information from the touch sensor is used to detect the approach of an object here, a configuration is also possible which comprises an infrared sensor, for example, and calculates the distance from the display unit 8 to the object with the sensor.

Furthermore, when not deciding that the prescribed condition is satisfied (that is, not deciding that the user is about to push an operating button), the operating button display update stop/restart unit 9 outputs an instruction to restart the display update of the operating button to the display controller 7.

The case where the prescribed condition is not satisfied here refers to one of the following cases concretely: when the line-of-sight detector 12 is unable to detect the line of sight of the user toward the display unit 8; when the posture detector 13 is unable to detect the prescribed posture in which the user is about to push the operating button; when the instruction input unit 10 is controlled by the user to perform a prescribed operation such as pushing a prescribed button of a remote control or steering switch (display restart button or switch); and when the distance between the object like a finger of the user and the touch screen becomes greater than the prescribed value (or not less than the prescribed value).

More specifically, when it decides that the prescribed condition is not satisfied (that the user is not pushing the operating button), the operating button display update stop/restart unit 9 outputs an instruction to restart the display update of the operating button to the display controller 7.

In addition, a configuration is also possible which outputs an instruction to restart the display update when the prescribed time period has elapsed from the time when the instruction was output to stop the display update of the operating button to the display controller 7 without any operation to the operating button.

Furthermore, the prescribed time period can be altered in accordance with a running state of the moving body in which the voice recognition system is mounted, such as a running speed or a road along which the vehicle is running.

For example, when the running speed of the moving body is high or the road conditions in which the vehicle is running are bad, the user has to concentrate on driving. Thus, considering that the user sometimes cannot operate the operating button, the prescribed time period is set longer. On the contrary, when the running speed of the moving body is low or the road conditions in which the vehicle is running are good, the prescribed time period is set shorter considering that the user is in a state of being able to operate the operating button rather easily.

Next, referring to flowcharts shown in FIG. 5-FIG. 8, the processing of the voice recognition system of the embodiment 1 will be described.

Figure 5:
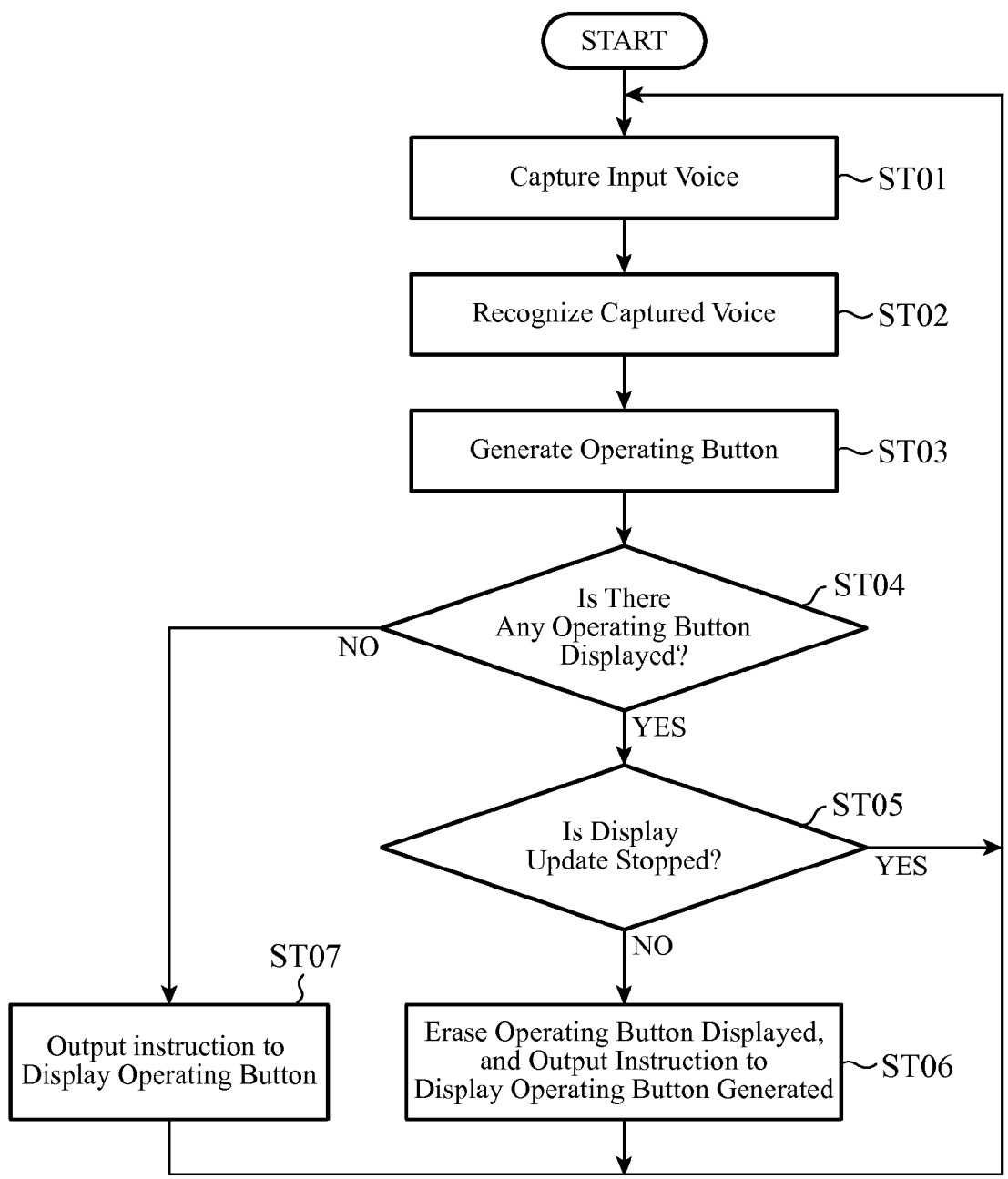
FIG. 5 is a flowchart showing processing of generating and displaying an operating button when the operating button display area can display only one operating button.

FIG. 5 is a flowchart showing the processing of generating and displaying an operating button when the operating button display area can display only one operating button as shown in FIG. 3, for example.

First, the voice acquiring unit 3 captures a user utterance collected with the microphone 2, that is, the input voice, and carries out A/D conversion by PCM, for example (step ST01).

Next, the voice recognition unit 5 detects the voice active section corresponding to the contents the user utters from the voice signal digitized by the voice acquiring unit 3, extracts the feature of the voice data from the voice active section, executes the recognition processing by referring to the voice recognition dictionary 4 in accordance with the feature, and outputs the recognition result (step ST02).

Then, the operating button generating unit 6 generates the operating button with a function corresponding to the recognition result output from the voice recognition unit 5 (step ST03).

After that, the display controller 7 decides whether the display unit 8 has any operating button already displayed on it or not (step ST04).

If it has an operating button that has already been displayed (YES at step ST04), the display controller 7 decides whether the display update of the operating button is stopped or not (step ST05). Then, unless the display update is stopped (NO at step ST05), the display controller 7 erases the operating button that has already been displayed, and outputs to the display unit 8 an instruction to display the operating button generated by the operating button generating unit 6 at step ST03 (step ST06).

On the other hand, when the display update is stopped (YES at step ST05), the display controller 7 returns the processing to step ST01 without displaying the operating button generated.

In addition, when no operating button is displayed at step ST04 (NO at step ST04), the display controller 7 outputs to the display unit 8 an instruction to display the operating button generated by the operating button generating unit 6 at step ST03 (step ST07).

Next, the case in which the operating button display area 60 of the display unit 8 can display a plurality of operating buttons will be described with reference to the flowchart of FIG. 6.

Figure 6:
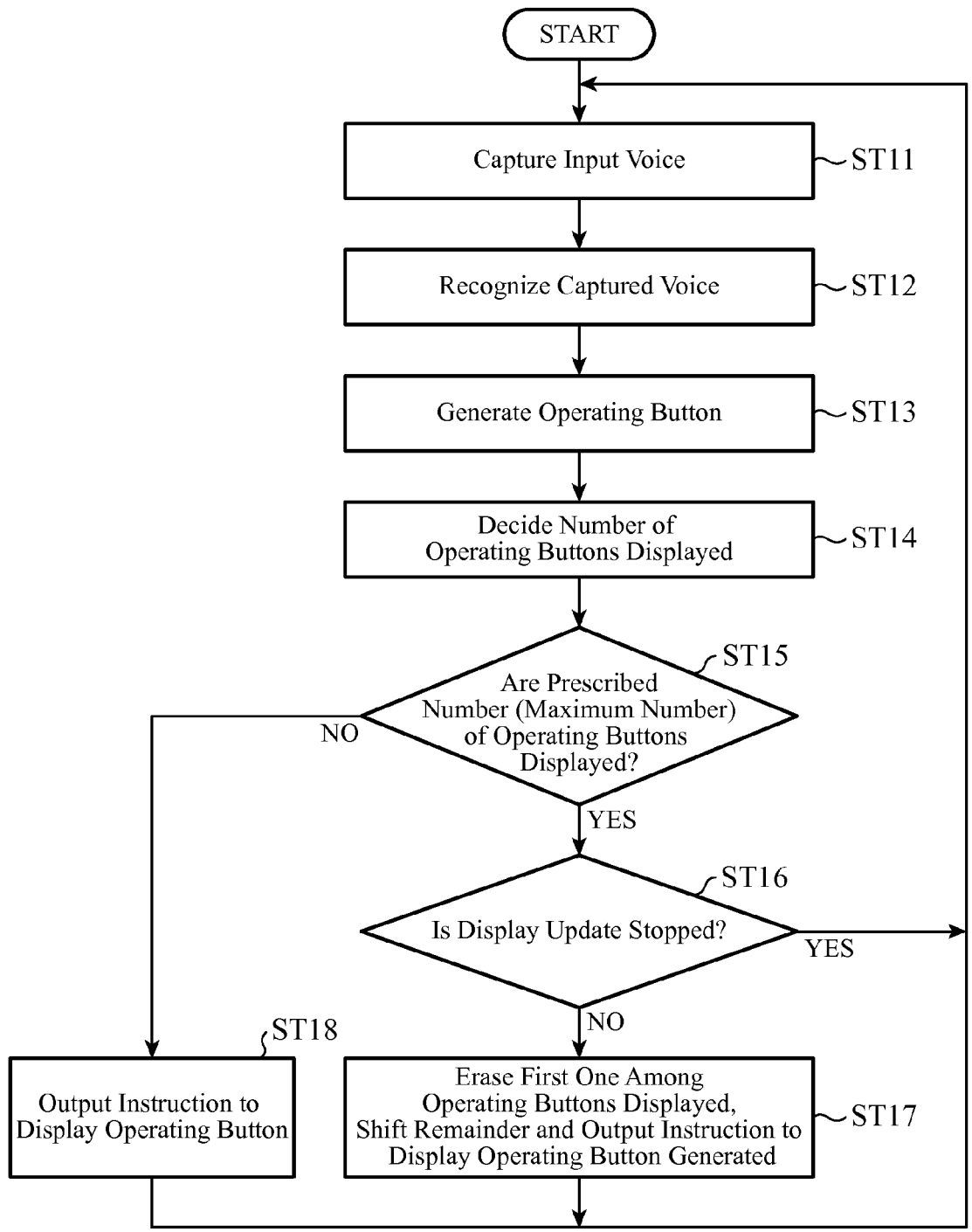
FIG. 6 is a flowchart showing processing of generating and displaying an operating button when the operating button display area can display a plurality of operating buttons.

FIG. 6 is a flowchart showing the processing of generating and displaying an operating button when the operating button display area 60 can display a plurality of (two in FIG. 4) operating buttons as shown in FIG. 4, for example.

As for the processing of steps ST11-ST13, since it is the same as that of steps ST01-ST03 of the flowchart shown in FIG. 5, its description will be omitted.

After generating the operating button at step ST13, the display controller 7 decides the number of the operating buttons that have already been displayed in the operating button display area 60 on the display unit 8 (step ST14).

Then, when the prescribed number of operating buttons (the maximum number of operating buttons the operating button display area 60 can display) have already been displayed (YES at step ST15 such as in the case of FIG. 4(*c*)), the display controller 7 decides whether the display update of the operating button is stopped or not (step ST16).

Unless the display update is stopped (NO at step ST16), the display controller 7 erases the first operating button (operating button 61 in the case of FIG. 4(*c*)) among the operating buttons displayed in the operating button display area 60, shifts the place of the remaining operating button (operating button 62 in the case of FIG. 4(*c*)) by one place (FIG. 4(*d*)), and outputs to the display unit 8 an instruction to display the operating button generated by the operating button generating unit 6 (operating button 63 in the case of FIG. 4(*d*)) at step ST13 (step ST17).

On the other hand, when the display update is stopped (YES at step ST16), the display controller 7 returns to the processing at step ST11 without displaying the operating button generated.

In addition, if the number of the operating buttons displayed is less than the prescribed number (the maximum number of buttons the operating button display area 60 is able to display) at step ST15 (NO at step ST15, such as in the case of FIG. 4(*b*)), the display controller 7 outputs the instruction to display the operating button generated by the operating button generating unit 6 (operating button 62 of FIG. 4(*c*)) to the display unit 8 (step ST18) in spite of the instruction signal for stopping the update of the display contents of the operating button by the operating button display update stop/restart unit 9.

Incidentally, in the flowchart of FIG. 5 or FIG. 6, the decision at step ST04 or at step ST14-ST15 can be omitted. More specifically, in spite of the presence or absence or the number of the operating buttons displayed, the display controller 7 can return to the processing at step ST01 or at step ST11 when the display update is stopped.

Figure 7:
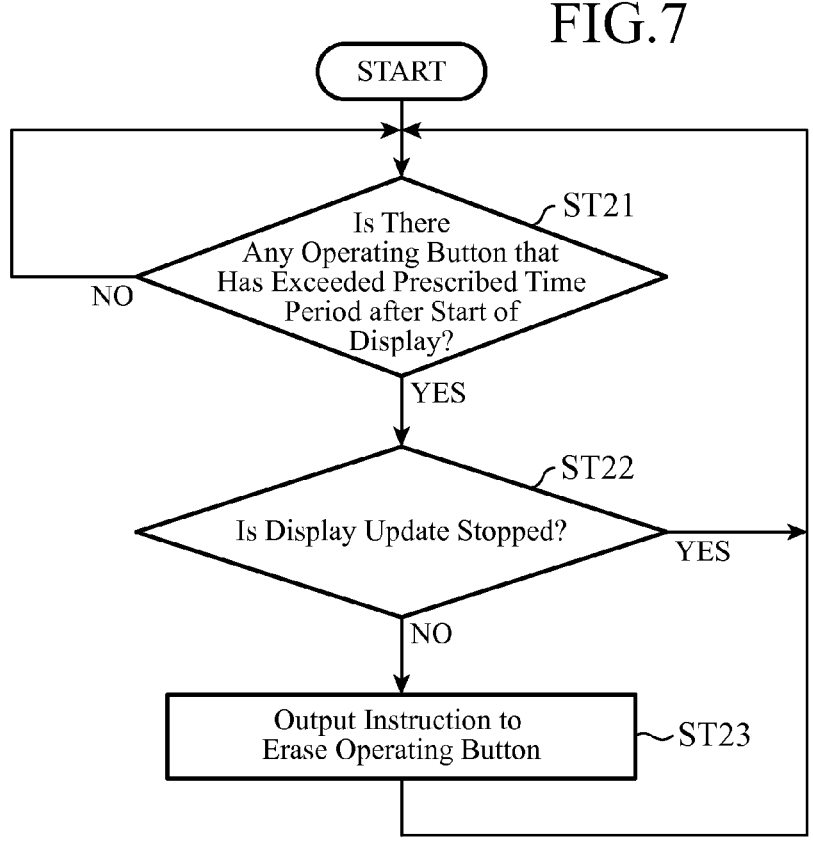
FIG. 7 is a flowchart showing processing of erasing an operating button which has already been displayed even when an operating button is not generated.

FIG. 7 is a flowchart showing the processing of erasing the operating button that has already been displayed, even if the operating button is not generated.

First, concerning the operating buttons displayed in the operating button display area 60 on the display unit 8, the display controller 7 decides whether there is an operating button that has been displayed for the prescribed time period from the display start or not (step ST21). Unless there is an operating button that has been displayed for the prescribed time period after the display (NO at step ST21), the display controller 7 returns to the processing at step ST21.

On the other hand, if there is an operating button that has been displayed for the prescribed time period (YES at step ST21), the display controller 7 decides whether the display update of the operating button is stopped or not (step ST22). If the display update is stopped (YES at step ST22), the display controller 7 returns to the processing at step ST21. Unless the display update is stopped (NO at step ST22), the display controller 7 outputs the instruction to erase from the display unit 8 the operating button that has been displayed for the prescribed time period after the display start (step ST23), and returns to the processing at step ST21.

Figure 8:
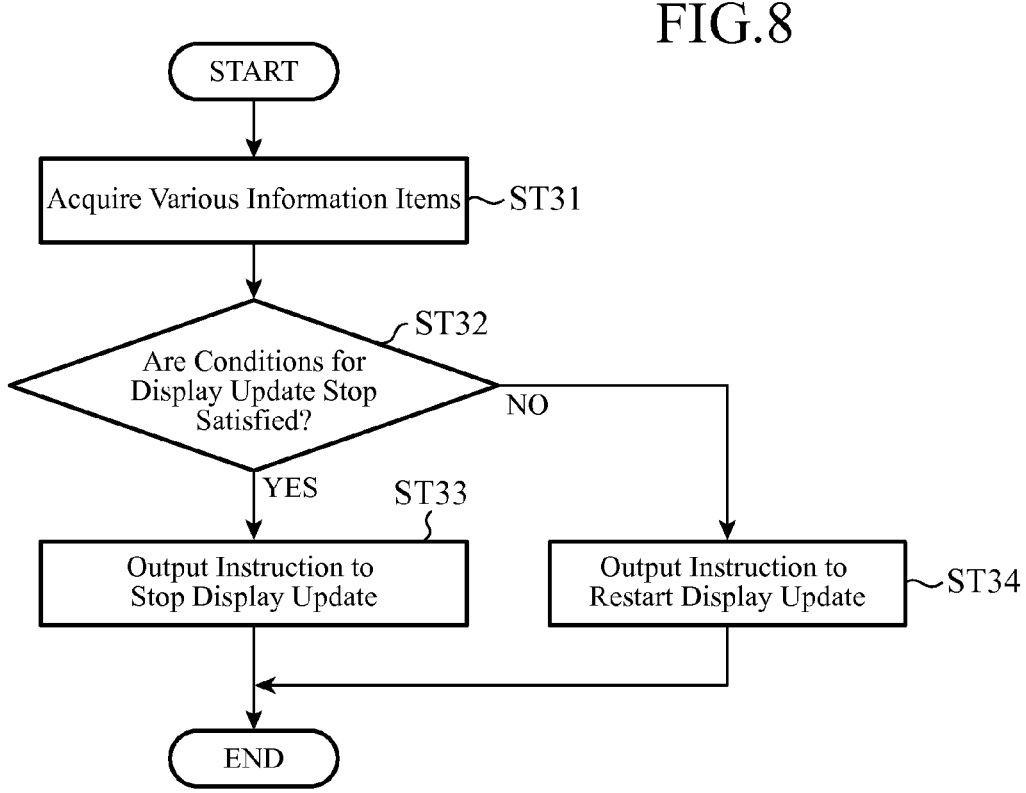
FIG. 8 is a flowchart showing processing when an operating button display update stop/restart unit outputs an instruction for a display update stop/restart of an operating button.

In addition, FIG. 8 is a flowchart showing the processing which causes the operating button display update stop/restart unit 9 to output an instruction for the display update stop/restart of the operating button.

First, the operating button display update stop/restart unit 9 acquires various pieces of information from the line-of-sight detector 12, the posture detector 13, and the instruction input unit 10 (step ST31). The term "various pieces of information" refers concretely to one of the line of sight information from the line-of-sight detector 12, the posture information from the posture detector 13, the operation information from the instruction input unit 10, the approach/contact information of an object to the touch screen, and the time period during which the display update is stopped.

Then, if the information it acquires satisfies the prescribed conditions (conditions for stopping the display update) described before (YES at step ST32), it outputs an instruction to stop the display update to the display controller 7 (step ST33).

On the other hand, when the prescribed conditions (conditions for stopping the display update) are not satisfied (NO at step ST32), it outputs an instruction to restart the display update (step ST34).

Next, the operation will be described using an instance.

For example, as shown in FIG. 3, when the operating button display area 60 is able to display only one operating button, and if a user A utters "I want to go to a convenience store" in a state without displaying any operating button (the state of FIG. 3(*a*)), the voice recognition unit 5 executes the recognition processing and outputs "convenience store" as the recognition result (step ST01-ST02 of FIG. 5).

Then, the operating button generating unit 6 generates the operating button 61 "convenience store" with the function corresponding to the recognition result "convenience store", that is, with the function of retrieving facilities belonging to the facility genre "convenience store" (step ST03).

Here, since no operating button is displayed in the operating button display area 60 on the display unit 8 (NO at step ST04), the display controller 7 outputs the instruction to display the operating button 61 to the display unit 8 (step ST07). As a result, the operating button 61 is displayed as shown in FIG. 3(*b*).

After that, if a user B utters "I must drop in at a bank", the operating button generating unit 6 generates an operating button 62 "bank" with the function corresponding to the recognition result "bank", that is, with the function of retrieving facilities belonging to the facility genre "bank" (steps ST01-ST03).

At this time, the operating button 61 "convenience store" has already been displayed in the operating button display area 60 on the display unit 8 (YES at step ST04). Thus, suppose that the user A is about to push the operating button 61 "convenience store", and his or her finger is approaching the display unit 8, for example. Then, the operating button display update stop/restart unit 9 outputs the instruction to stop the display update to the display controller 7, thereby stopping the display update.

As a result, the display controller 7 decides that the display update of the operating button is stopped (YES at step ST05), and the operating button 62 "bank" is not displayed on the display unit 8.

On the other hand, unless the user A is about to push the operating button 61 "convenience store" such as the finger of the user A does not approach the display unit 8, the operating button display update stop/restart unit 9 does not output the instruction for stopping the display update to the display controller 7.

As a result, the display controller 7 does not decide that the display update of the operating button is stopped (NO at step ST05). Thus, the display controller 7 outputs to the display unit 8 the instruction to erase the operating button 61 "convenience store" and to display the operating button 62 "bank" (see step ST06, and FIG. 3(*c*)).

Next, the operation will be described in the case where the operating button display area 60 can display a plurality of operating buttons, two operating buttons as shown in FIG. 4, for example. More specifically, the maximum number (prescribed number) of the operating buttons the operating button display area 60 can display is two.

Then, an example as shown in FIG. 4(*b*) will be described which displays only the operating button 61 "convenience store". In this state, if the user B utters "I must drop in at a bank", the operating button 62 "bank" is generated (steps ST11-ST13 of FIG. 6).

At this time, if the user A is about to push the operating button 61 "convenience store", and if his or her finger is approaching the display unit 8, the operating button display update stop/restart unit 9 outputs an instruction to stop the display update to the display controller 7.

However, since the number of the operating buttons displayed on the display unit 8 is one (step ST14 and NO at step ST15), the operating button display update stop/restart unit 9 outputs an instruction signal to display the operating button 62 "bank" regardless of whether the display update is stopped or not (step ST18).

As a result, as shown in FIG. 4(*c*), the operating button 62 "bank" is displayed.

Next, if the user B is about to push the operating button 62 "bank" in this state, for example, and if his or her finger is approaching the display unit 8, the operating button display update stop/restart unit 9 outputs an instruction to stop the display update to the display controller 7.

At this time, if the user A utters "Is there any parking lot nearby?", an operating button 63 "parking lot" is generated (step ST11-ST13).

However, as shown in FIG. 4(*c*), since the two (the maximum number (prescribed number) of) operating buttons are displayed, and the display update is stopped (YES at step ST15 and YES at step ST16), the display controller 7 does not output the instruction signal to display the operating button 63 "parking lot" (display of FIG. 4(*c*) is continued).

On the other hand, unless the finger of the user is approaching the display unit 8 in the state shown in FIG. 4(*c*), the operating button display update stop/restart unit 9 outputs an instruction to restart the display update to the display controller 7. Thus, the decision whether the display update is stopped or not (step ST16) is NO in this case.

At this time, if the user A utters "Is there any parking lot nearby?", the processing up to generating the operating button 63 "parking lot" is the same as that described before (steps ST11-ST13).

In this case, however, since the two (maximum number (prescribed number) of) operating buttons are displayed, and the display update is not stopped (YES at step ST15 and NO at step ST16), the display controller 7 erases the first operating button 61 among the operating buttons 61 and 62 displayed, shifts the remaining operating button 62, and outputs an instruction to display the operating button 63 generated at step ST13 (step ST17).

As a result, the operating button 63 "parking lot" is displayed as shown in FIG. 4(*d*).

This enables preventing the problem of the conventional example in that at the moment when the user is about to push the operating button 61 "convenience store" to retrieve a convenience store in FIG. 4(*c*), for example, the operating button 61 "convenience store" can be changed to the operating button 62 "bank" owing to an utterance of another user, thereby causing the user to push the unintended operating button 62, that is, to retrieve the undesired "bank".

As described above, according to the present embodiment 1, it is configured in such a manner that when it decides from the line of sight of the user or the posture or the prescribed operation that the user is about to select (push) an operating button, it stops the display update of the operating button, and halts displaying the operating button generated from the newly recognized voice while the display update is stopped. Accordingly, at the timing when the user is about to select the desired operating button, it can prevent the operating button from shifting its position, from changing to another operating button or from being deleted. As a result, it can prevent the user from selecting an undesired operating button, thereby being able to prevent a malfunction and to improve the convenience of a user.

Embodiment 2

Figure 9:
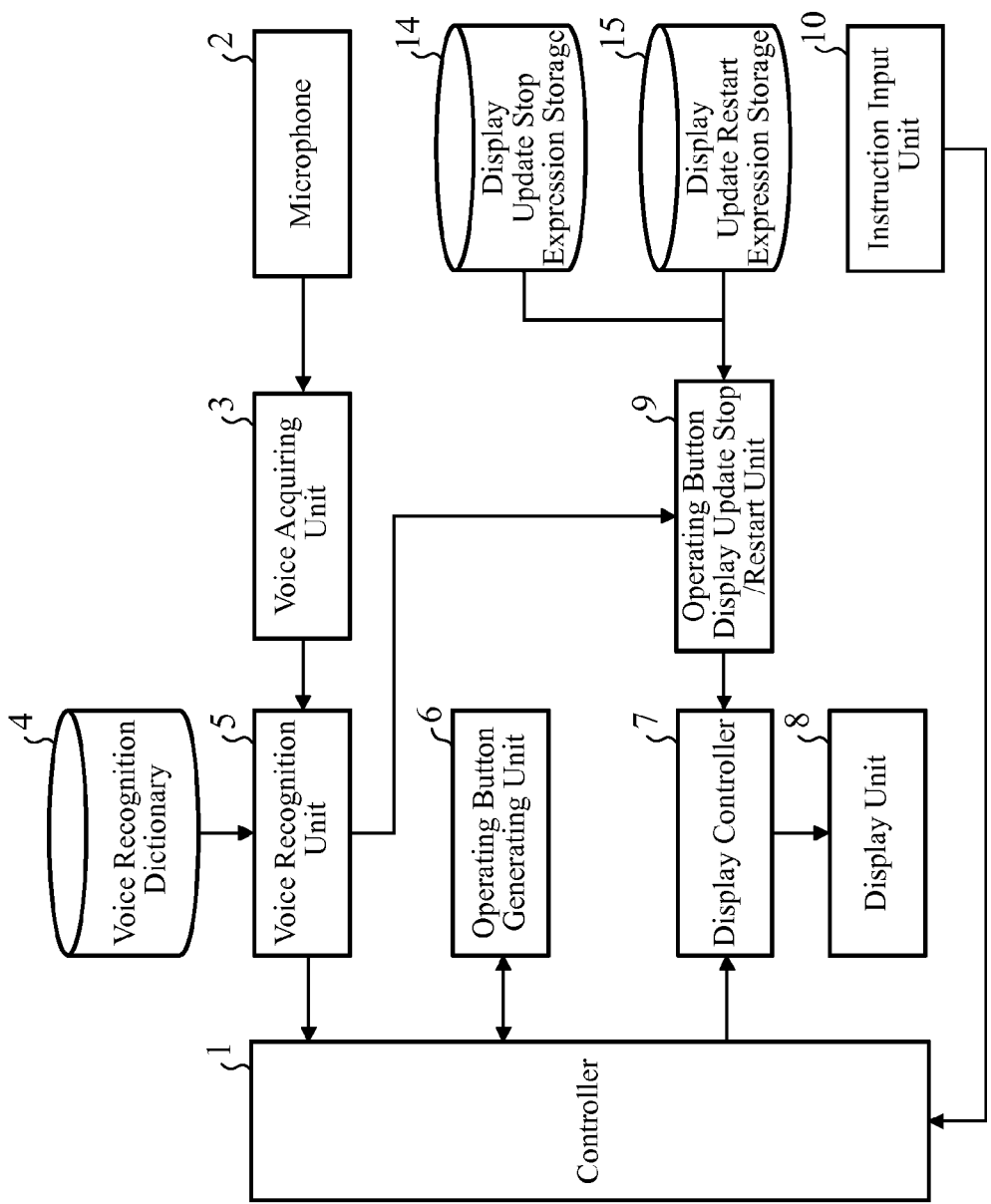
FIG. 9 is a block diagram showing an example of a voice recognition system of an embodiment 2.

FIG. 9 is a block diagram showing an example of a voice recognition system of an embodiment 2 in accordance with the present invention. Incidentally, the same components as those described in the embodiment 1 are designated by the same reference numerals, and their duplicate description will be omitted. As compared with the embodiment 1, the embodiment 2 differs in that it comprises a display update stop expression storage 14 and a display update restart expression storage 15, and that the operating button display update stop/restart unit 9 carries out stop/restart of the display update by the voice recognition of the voice recognition unit 5.

As compared with that of the embodiment 1, the voice recognition unit 5 further recognizes a word meaning a stop/restart of the display update of the operating button such as "stop", "update stop", "restart", and "update restart", and outputs the recognition result.

The display update stop expression storage 14 stores words meaning the stop of the display update of the operating button such as "stop" and "update stop".

The display update restart expression storage 15 stores words meaning the restart of the display update of the operating button such as "restart" and "update restart".

The operating button display update stop/restart unit 9 refers to the display update stop expression storage 14 and the display update restart expression storage 15, and decides whether the recognition result output by the voice recognition unit 5 represents a display update stop stored in the display update stop expression storage 14 or not. Then, when it decides that the recognition result output by the voice recognition unit 5 is contained in the display update stop expression storage 14, it outputs to the display controller 7 an instruction signal to stop the display update; and when it decides that the recognition result represents a restart of the display update stored in the display update restart expression storage 15, it outputs to the display controller 7 an instruction signal to restart the display update of the operating button.

Next, the processing of the voice recognition system of the embodiment 2 will be described with reference to the flowchart of FIG. 10.

Figure 10:
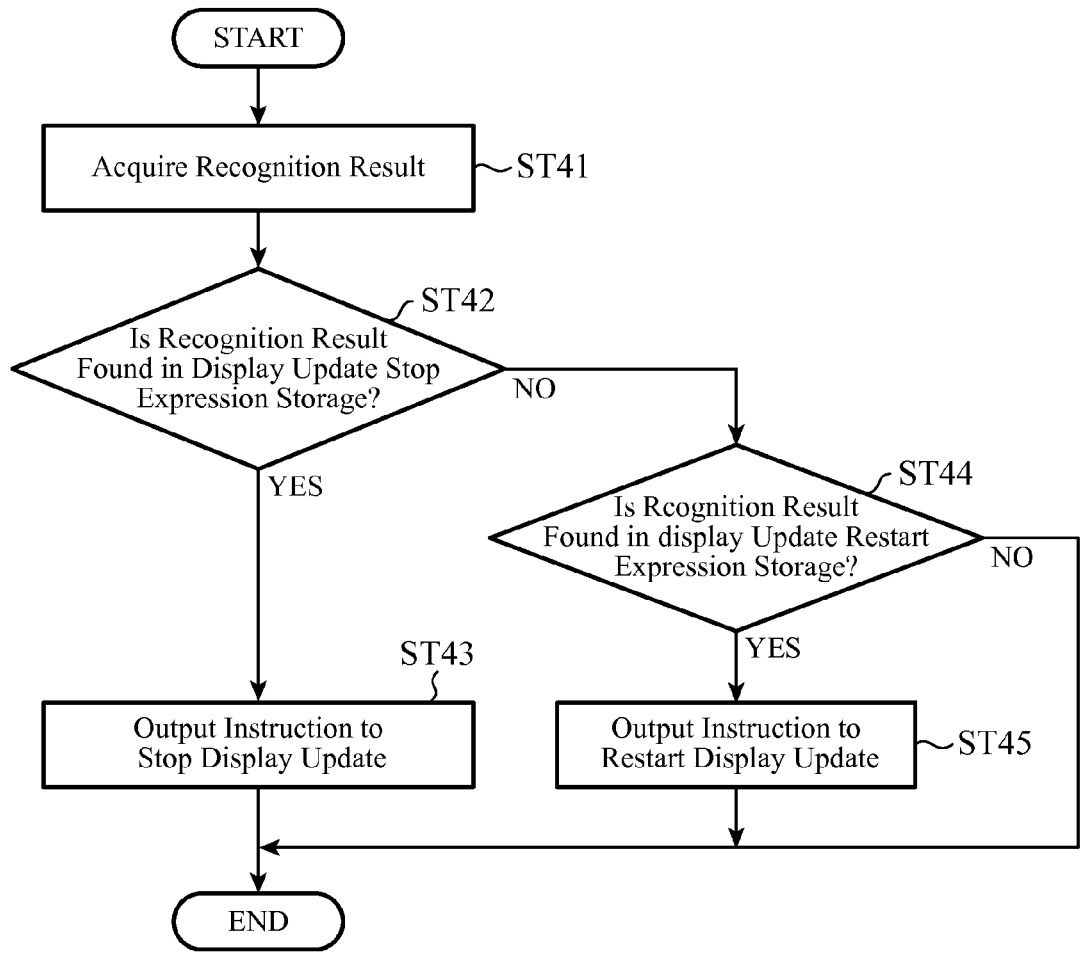
FIG. 10 is a flowchart showing processing when the operating button display update stop/restart unit outputs the instruction for the display update stop/restart of an operating button according to voice recognition.

FIG. 10 is a flowchart showing the processing in which the operating button display update stop/restart unit 9 outputs an instruction to stop/restart the display update of the operating button by the voice recognition.

First, the operating button display update stop/restart unit 9 acquires the recognition result output from the voice recognition unit 5 (step ST41).

Next, the operating button display update stop/restart unit 9 decides whether the recognition result is contained in the display update stop expression storage 14 or not (step ST42). If the recognition result is contained (YES at step ST42), it outputs the instruction to stop the display update to the display controller 7 (step ST43).

On the other hand, if the recognition result it acquires at step ST41 is not contained in the display update stop expression storage 14 (NO at step ST42), it decides whether the recognition result is contained in the display update restart expression storage 15 or not (step ST44). If the recognition result is contained (YES at step ST44), it outputs an instruction to restart the display update to the display controller 7 (step ST46).

In addition, if the recognition result it acquires at step ST41 is not contained in the display update restart expression storage 15 (NO at step ST44), it terminates the processing.

Thus, the present embodiment 2 differs from the embodiment 1 in that the operating button display update stop/restart unit 9 employs, as the condition for executing the instruction to stop/restart the display update of the operating button, the utterance of the user instead of the line of sight of the user, the posture, or the operation input. As for the other operation processing and screen transitions, since they are the same as those of the embodiment 1, their drawings and description will be omitted.

As described above, according to the present embodiment 2, it is configured in such a manner that when the user makes an utterance to stop the display update of the operating button, it stops the display update of the operating button, and does not display the button generated by the newly recognized voice while the display update is stopped, thereby being able to prevent the positional shift of the operating button at the timing when the user is about to select the desired operating button, and to prevent the change to another operating button or the deletion of the operating button. Accordingly, the present embodiment 2 can prevent the user from selecting an undesired operating button, and can prevent a malfunction from occurring, and can improve the convenience of the user.

Incidentally, in the foregoing embodiments 1 and 2, a configuration is also possible in which when the display controller 7 receives the instruction signal to stop the display update from the operating button display update stop/restart unit 9, the display controller 7 outputs to the display unit 8 an instruction to alter the display mode of the operating button that has already been displayed, and when it receives the instruction signal to restart the display update from the operating button display update stop/restart unit 9, it outputs an instruction to restore the operating button altered. Here, the term "display mode" refers to the size, color, and font of characters on the operating button, for example.

More specifically, when the display controller 7 receives the instruction signal to stop the display update from the operating button display update stop/restart unit 9, the display controller 7 can output to the display unit 8 the instruction to alter at least one of the size, color and font of the characters on the operating button that has already been displayed, and when it receives the instruction signal to restart the display update from the operating button display update stop/restart unit 9, it can output the instruction to restore the operating button altered.

This enables the user to visually decide whether the display update of the operating button is stopped or not. In addition, highlighting the operating button can facilitate the selection.

In addition, in the foregoing embodiments 1 and 2, a configuration is also possible which further comprises an operating button display history storage (not shown) for storing a display history of the operating buttons displayed on the display unit 8. In this case, every time the operating button is erased from the display unit 8 owing to the display update, the display controller 7 stores the information about the operating button in the operating button display history storage.

Then, when the user carries out a scrolling operation of the operating button display area while the display update is stopped, the display controller 7 controls in such a manner as to display the operating buttons displayed in the past in the order of being erased in accordance with the information stored in the operating button display history storage.

More specifically, when the user utters "I want to go to a convenience store" and "I must drop in at a bank" in the state of FIG. 4(*a*), for example, the operating buttons 61 and 62 corresponding to the "convenience store" and "bank" are displayed as shown in FIG. 4(*c*). Here, assume that the maximum number of the operating buttons that can be displayed is "2", and when the user utters "Is there any parking lot nearby?", the operating button 61 "convenience store", which is the first operating button displayed earliest, is erased, and the operating button 63 "parking lot" is displayed (FIG. 4(*d*)).

At this time, the display controller 7 stores the information about the erased operating button 61 "convenience store" in the operating button display history storage. Then, if the user performs the scrolling operation in the operating button display area while the display update is stopped, the display controller 7 shifts the operating buttons during display in response to the signal from the touch sensor, and outputs to the display unit 8 the instruction to display the operating button 61 "convenience store" displayed in the past in accordance with the information stored in the operating button display history storage.

Figure 11:
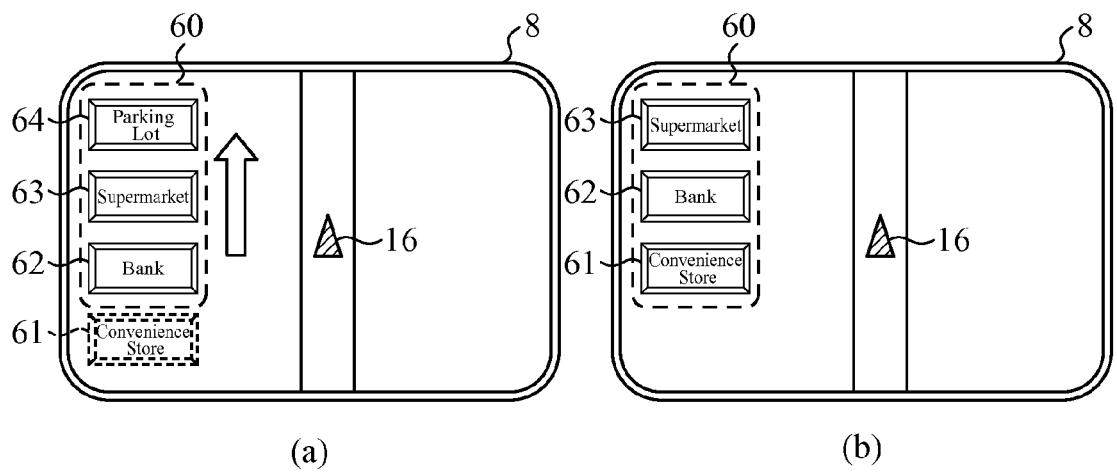
FIG. 11 is a diagram showing a screen example when displaying an operating button erased from the operating button display area by scrolling.

FIG. 11 is a diagram showing an example of a screen in which the operating button erased from the operating button display area 60 is displayed by scrolling.

It is assumed here that the maximum number of the operating buttons that the operating button display area 60 can display is "3". FIG. 11(*a*) shows a state in which the operating button 64 "parking lot" is displayed and the first operating button 61 "convenience store" is erased, after the operating button 61 "convenience store", the operating button 62 "bank", and the operating button 63 "supermarket" are displayed.

At this time, the display controller 7 stores the information about the erased operating button 61 "convenience store" in the operating button display history storage. Then, when the user scrolls up as indicated by the up arrow in FIG. 11(*a*) while the display update is stopped, the display controller 7 shifts the operating buttons 62-64 during display upward, and outputs to the display unit 8 the instruction to display the operating button 61 "convenience store" stored in the operating button display history storage. As a result, the operating buttons are scrolled and displayed as shown in FIG. 11(*b*).

Incidentally, scrolling of the operating buttons can be performed by any one of the following operations: a touch operation that sweeps over the integrated display type touch screen (display unit 8); and operations with a steering switch, with a prescribed button of a remote control and with a device for manual operation.

Figure 12:
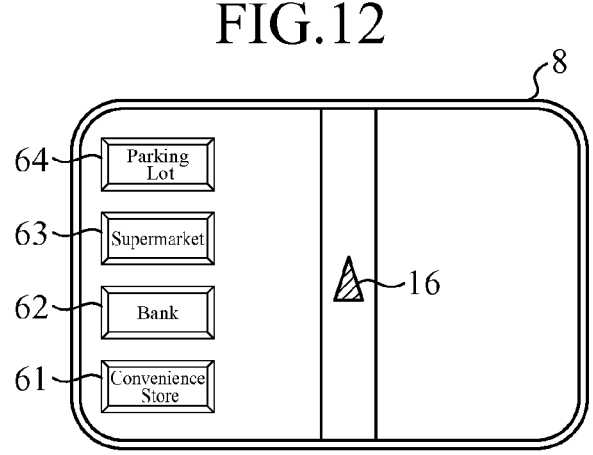
FIG. 12 is a diagram showing a screen example of a list of operating buttons stored as a display history when the display update is stopped.

In addition, when receiving the instruction signal to stop the display update, the display controller 7 can output the instruction to display a list of the operating buttons stored as the display history as shown in FIG. 12 in addition to the operating buttons displayed at the time. More specifically, when the display update is stopped after the state as shown in FIG. 11(*a*), the display controller 7 also displays the operating button 61 "convenience store" stored in the operating button display history storage as shown in FIG. 12 without performing scrolling. In this case, regardless of the operating button display area 60, all the operating buttons are displayed which are during display or stored.

Furthermore, when the display controller 7 stores information about an operating button in the operating button display history storage, it can skip storing the operating button if the same information has already been stored (merge into the pervious information).

For example, when the operating button display history storage stores the information about the operating buttons in the order of "convenience store" and "bank", and information about the operating button "convenience store" is further acquired, since it has already been stored in the storage, the information is not stored anymore.

Thus, the display controller 7 can prevent multiple display of the same operating button.

In addition, the foregoing embodiments 1 and 2 can further comprise an operating button generating history storage (not shown) that stores information about the operating button generated by the operating button generating unit 6. In this case, according to the recognition result output from the voice recognition unit 5, the display controller 7 stores in the operating button generating history storage the information about the operating button which is generated by the operating button generating unit 6 but not displayed on the display unit 8 because the display update is stopped.

Then, receiving the instruction signal to restart the display update, the display controller 7 outputs an instruction to display, instead of the operating buttons displayed on the display unit 8, the operating buttons based on the information stored in the operating button generating history storage on the display unit 8.

At this time, regardless of the operating button display area 60, the display controller 7 can output an instruction to display the maximum number of operating buttons displayable on the display unit 8, or can output an instruction to display a prescribed number of buttons not greater than the maximum number.

To be concrete, for example, while the operating buttons are displayed as shown in FIG. 4(*c*) and the display update is stopped, and an utterance "I must drop in at a supermarket" is given, the operating button generating unit 6 generates an operating button "supermarket". Here, since the display update is stopped, the display controller 7 does not output the instruction to display the operating button "supermarket" on the display unit 8, but stores the information about the operating button in the operating button generating history storage.

Likewise, if an utterance "Is there any parking lot nearby?" is given, the display controller 7 stores the information about the operating button "parking lot" in the operating button generating history storage. After that, receiving the instruction signal to restart the display update, the display controller 7 outputs an instruction to display the operating button "supermarket" and the operating button "parking lot" on the display unit 8 in accordance with the information stored in the operating button generating history storage instead of the operating button "bank" and the operating button "convenience store" on the display unit 8.

In addition, although the foregoing embodiments 1 and 2 are described on the assumption that the user can select an operating button by pushing it while the display update is stopped, a configuration is also possible which enables the user to select an operating button by uttering the name of the operating button while the display update is stopped.

In addition, in the foregoing embodiments 1 and 2, a configuration is also possible which reads out the names of the operating buttons displayed on the display unit 8 while the display update is stopped, and enables the user to determine a desired operating button during its reading, thereby selecting it. In this case, while reading out the operating button name or within a prescribed time period after read out, the user can determine it manually through an instruction input unit such as a steering switch, or can execute the function corresponding to the operating button read out when an uttered voice such as "determine" or "select" is recognized.

In this case, the system comprises a speech synthesis unit (not shown) that generates a speech from a character string, and a speech controller (not shown) that outputs an instruction signal to output the speech generated by speech synthesis unit to a voice output unit like a speaker. Then, the speech controller, receiving the display update stop signal from the operating button display update stop/restart unit 9, acquires the name of the operating button displayed on the display unit 8 from the display controller 7, and outputs to the speech synthesis unit an instruction to synthesize the speech corresponding to the name. Receiving the instruction, the speech synthesis unit synthesizes the speech. Then, the speech controller outputs to the voice output unit an instruction to output the voice data generated by the speech synthesis unit.

Incidentally, as for the operation at the time when the user determines the operating button manually or by a voice while it is read out or within the prescribed time period after the reading out, since it can utilize a publicly known technique, the description thereof will be omitted.

Embodiment 3

Although the foregoing embodiments 1 and 2 are described by way of example that applies the voice recognition system in accordance with the present invention to the navigation system mounted on the moving body such as a vehicle, it is applicable not only to an onboard navigation system, but also to a navigation system for a moving body including a person, vehicle, railway vehicle, ship and aircraft and to a server of the voice recognition system or a server of the navigation system. In addition, it is applicable to any type of applications such as applications of a voice recognition system installed in a mobile data terminal like a smartphone, tablet PC and mobile phone, and applications of a navigation system.

Figure 13:
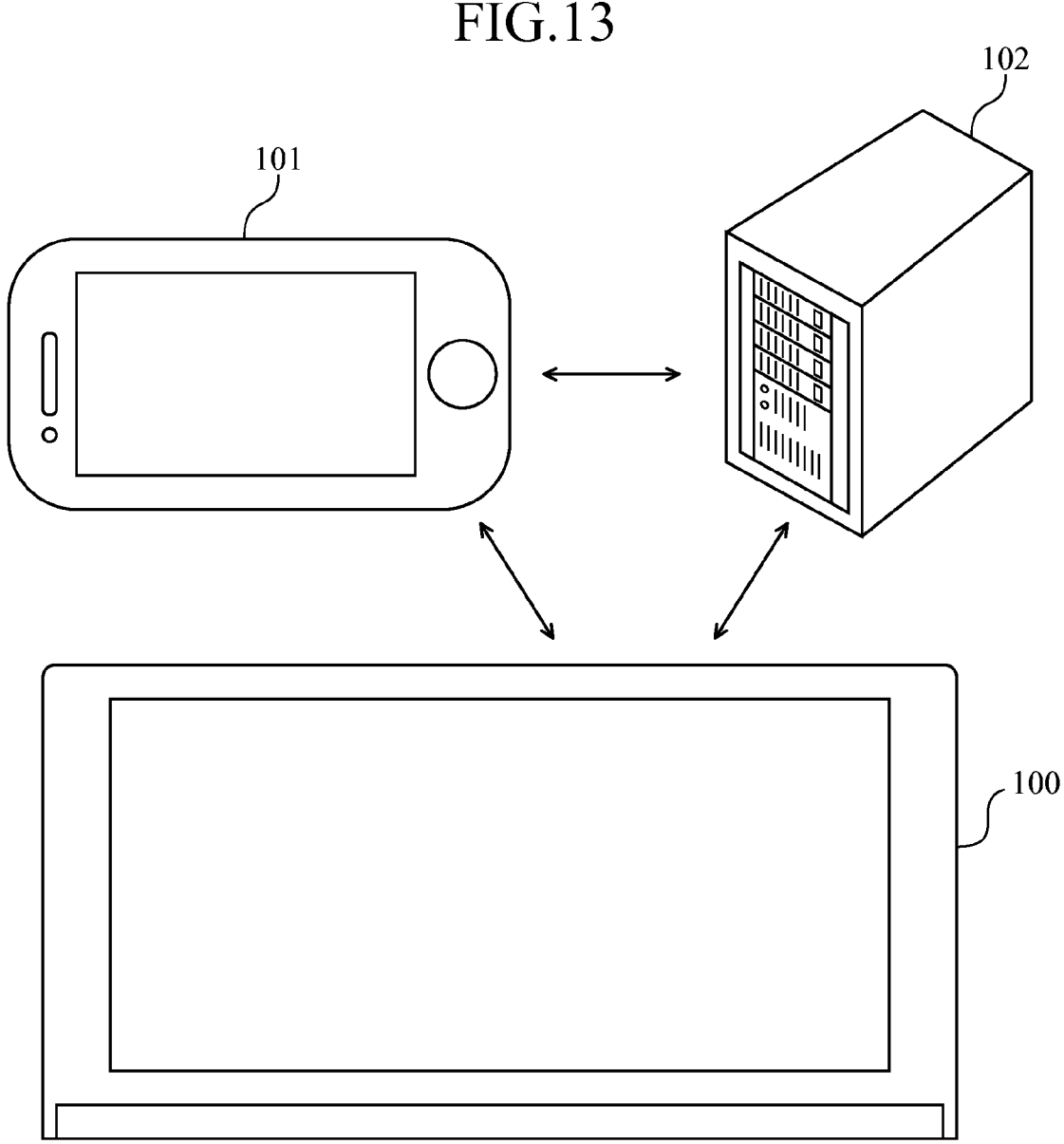
FIG. 13 is a diagram showing an outline of a navigation system of an embodiment 3.

FIG. 13 is a diagram showing an outline of a navigation system of an embodiment 3 in accordance with the present invention. The navigation system can take the following various configurations: a configuration in which an onboard apparatus 100 executes a voice recognition processing and navigation processing in cooperation with at least one of a mobile data terminal 101 like a smartphone and a server 102; a configuration in which at least one of the mobile data terminal 101 like a smartphone and the server 102 executes the voice recognition processing and navigation processing to cause the onboard apparatus 100 to display a recognition result and map information; and the like. A configuration of the navigation system will be described below.

Although the embodiments 1 are 2 described on the assumption that the onboard apparatus 100 shown in FIG. 13 has all the functions of a voice recognition system in accordance with the present invention, the navigation system of the present embodiment 3 will be described using the following examples:

an example in which the server 102 executes the voice recognition processing and the onboard apparatus 100 displays the recognition result to provide it to a user; and an example in which the mobile data terminal 101 executes the voice recognition processing in cooperation with the server 102, and the onboard apparatus 100 displays the recognition result to provide it to a user.

First, the case will be described where the server 102 executes the voice recognition processing, and the onboard apparatus 100 displays the recognition result, that is, where the onboard apparatus 100 functions as a display device in cooperation with the server 102 with the voice recognition function.

In the configuration, it is conceivable that the onboard apparatus 100 carries out communication with the server 102 directly, or with the server 102 via the mobile data terminal 101. The server 102 functions as the voice recognition system described in the foregoing embodiments 1 and 2. In addition, the onboard apparatus 100 functions as a display device that comprises at least the display unit 8 for providing a user with the recognition result given by the server 102.

At this time, it is conceivable that (1) the server 102 has only the voice recognition function, and the onboard apparatus 100 has all the other functions, that is, the onboard apparatus 100 functions as the recognition result display apparatus that acquires the recognition result and causes the display unit to display it; and that (2) the onboard apparatus 100 has only a voice acquiring function, a communication function and a display function, and the server 102 has all the other functions, that is, the onboard apparatus 100 functions only as a display device that displays the recognition result acquired.

First, the case (1) will be described where the server 102 has only the voice recognition function and the onboard apparatus 100 has all the other components, that is, where the onboard apparatus 100 functions as a recognition result display apparatus that acquires the recognition result and causes the display unit to display it.

In this case, the server 102 is a voice recognition server comprising the voice recognition dictionary 4 and the voice recognition unit 5, and the onboard apparatus 100 serving as the recognition result display apparatus comprises the controller 1, voice acquiring unit 3, operating button generating unit 6, display controller 7, display unit 8, operating button display update stop/restart unit 9 and communication function (a voice data transmitter and a recognition result acquiring unit).

Then, the voice data transmitter (not shown) in the communication function transmits the voice data acquired by the voice acquiring unit 3 to the server 102, and the recognition result acquiring unit (not shown) acquires the result of the voice recognition by the server 102 from the server 102. In addition, the operating button generating unit 6 generates the operating button with a function corresponding to the recognition result the recognition result acquiring unit acquires from the server 102. As for the other functions, since they are the same as those of the voice recognition system of the embodiment 1 or 2, their description will be omitted.

Next, the case (2) will be described where the onboard apparatus 100 has only the voice acquiring function, communication function and display function, and the server 102 has all the other components, that is, where the onboard apparatus 100 functions only as a display device for displaying the recognition result acquired.

In this case, the onboard apparatus 100 has only the voice acquiring function, communication function and display function basically, and receives the voice recognition result by the server 102 and provides it to the user.

More specifically, the server 102 works as a voice recognition system comprising all the components other than the display unit 8, and the server 102 which operates as the voice recognition system recognizes the voice uttered by the user, and causes the onboard apparatus 100 working as a display device to display the recognition result.

The configuration can also offer the same advantages as the embodiment 1 or 2.

In addition, a configuration will be described in which the mobile data terminal 101 carries out the voice recognition processing in cooperation with the server 102, and the onboard apparatus 100 provides the recognition result to the user.

In the configuration, an example is conceivable in which the onboard apparatus 100 communicates with the server 102 via the mobile data terminal 101, and an application of the mobile data terminal 101 carries out the voice recognition processing in cooperation with the server 102. In addition, the onboard apparatus 100 functions as a display device comprising at leas the display unit 8 for providing the user with the recognition result by the mobile data terminal 101 and the server 102.

In this case, the onboard apparatus 100 basically comprises only the voice acquiring function, communication function and display function, receives the voice recognition result by the cooperation of the mobile data terminal 101 and the server 102, and provides the user with the result.

More specifically, an application of the mobile data terminal 101 causes the onboard apparatus 100 serving as the display device to display the recognition result of the voice uttered by the user.

Such the configuration can offer the same advantages of the embodiment 1 or 2.

Incidentally, it is to be understood that a free combination of the individual embodiments, variations of any components of the individual embodiments or removal of any components of the individual embodiments is possible within the scope of the present invention.

INDUSTRIAL APPLICABILITY

A voice recognition system in accordance with the present invention is applicable not only to an onboard navigation system, but also to a navigation system for a moving body including a person, vehicle, railway vehicle, ship or aircraft; to a portable navigation system and a portable information processing apparatus; and to an application of a navigation system to be installed in a server for an onboard information delivery system, and for a mobile data terminal such as a smartphone, tablet PC, and mobile phone.

DESCRIPTION OF REFERENCE SYMBOLS

1 controller; 2 microphone; 3 voice acquiring unit; 4 voice recognition dictionary; 5 voice recognition unit; 6 operating button generating unit; 7 display controller; 8 display unit; 9 operating button display update stop/restart unit; 10 instruction input unit; 11 camera; 12 line-of-sight detector; 13 posture detector; 14 display update stop expression storage; 15 display update restart expression storage; 16 own vehicle mark; 60 operating button display area; 61, 62, 63, 64 operating button; 100 onboard apparatus; 101 mobile data terminal; 102 server.

What is claimed is:

1. A voice recognition system that recognizes a voice uttered by a user and displays a recognition result, the voice recognition system comprising:
 a voice acquirer that detects and acquires the voice uttered by the user;
 a voice recognition unit that recognizes voice data acquired by the voice acquirer by referring to a voice recognition dictionary and outputs a recognition result continuously while the voice recognition system is in operation;
 an operating button generator that generates an operating button with a function corresponding to the recognition result output by the voice recognition unit;
 a display that displays the operating button generated by the operating button generator;
 a display controller that controls display content of the operating button on the display; and
 an operating button display update stop/restart unit that outputs an instruction signal that instructs the display controller to stop and restart an update of the display content of the operating button depending on whether the user is about to touch the operating button displayed on the display or not, wherein
 the operating button display update stop/restart unit outputs an instruction signal for stopping the update of the display content of the operating button when deciding that the user is about to touch the operating button displayed on the display; and
 the display controller instructs the display to stop a display update of the operating button displayed on the display when receiving the instruction signal for stopping the update of the display content of the operating button from the operating button display update stop/restart unit,
 an operating button display history storage that stores a display history of the operating button displayed on the display, wherein
 the display controller stores, every time the operating button is erased from the display owing to the display update of the operating button, information about the erased operating button in the operating button display history storage, and instructs the display to display the operating button stored in the operating button display history storage when scrolling of the operating button is carried out during a stop of the display update of the operating button.

2. The voice recognition system according to claim 1, further comprising:
 an instruction inputter that accepts an instruction by various operations of the user, wherein
 the operating button display update stop/restart unit outputs the instruction signal for stopping the update of the display content of the operating button by making a decision that the user is about to push the operating button in a case where the instruction inputter accepts a prescribed operation.

3. The voice recognition system according to claim 2, wherein
 the instruction inputter comprises a proximity sensor that detects approach of an object, wherein
 the case where the instruction inputter accepts the prescribed operation refers to a case where the instruction inputter calculates the distance between the proximity sensor and the object from a signal from the proximity sensor, and the distance calculated is not greater than a prescribed value.

4. The voice recognition system according to claim 1, further comprising:
 a line-of-sight detector that detects a line of sight of the user, wherein
 the operating button display update stop/restart unit decides that the user is about to touch the operating button when the line-of-sight detector detects the line of sight of the user toward the display, and outputs the instruction signal for stopping the update of the display content of the operating button.

5. The voice recognition system according to claim 1, further comprising:
 a posture detector that detects a posture of the user, wherein
 the operating button display update stop/restart unit decides, when the posture detector detects a prescribed posture, that the user is about to push the operating button, and outputs the instruction signal for stopping the update of the display content of the operating button.

6. The voice recognition system according to claim 1, wherein
when the number of operating buttons displayed on the display is less than a prescribed number,
the operating button display update stop/restart unit, even deciding that the user is about to touch the operating button, does not instruct to stop the update of the display content of the operating button.

7. The voice recognition system according to claim 1, further comprising:
a display update stop expression storage that stores a word meaning a display update stop of the operating button, wherein
the operating button display update stop/restart unit, when deciding that the recognition result output from the voice recognition unit is contained in the display update stop expression storage, outputs the instruction signal for stopping the update of the display content of the operating button.

8. The voice recognition system according to claim 1, wherein
the operating button display update stop/restart unit, when not deciding that the user is about to touch the operating button, outputs an instruction signal that instructs to restart the update of the display content of the operating button; and
the display controller instructs the display to restart the display update of the operating button displayed on the display when the update of the operating button on the display is stopped and when receiving the instruction signal of an update restart of the display contents of the operating button from the operating button display update stop/restart unit.

9. The voice recognition system according to claim 1, wherein
the operating button display update stop/restart unit restarts the update of the display content of the operating button when a prescribed time period has elapsed without any touch on the operating button from output of the instruction signal for stopping the update of the display content of the operating button.

10. The voice recognition system according to claim 9, wherein
the voice recognition system is mounted in a moving body; and
the operating button display update stop/restart unit alters the prescribed time period in accordance of a running state of the moving body.

11. The voice recognition system according to claim 1, wherein
the display controller alters a display mode of the operating button displayed on the display when receiving the instruction signal for stopping the update of the display content of the operating button from the operating button display update stop/restart unit.

12. The voice recognition system according to claim 11, wherein
the display mode refers to at least one of a size, a color and a font of characters of the operating button.

13. The voice recognition system according to claim 1, further comprising:
an operating button display history storage that stores a display history of the operating button displayed on the display, wherein the display controller stores, every time the operating button is erased from the display owing to the display update of the operating button, information about the erased operating button in the operating button display history storage, and instructs the display to display a list of operating buttons stored in the operating button display history storage during a stop of the display update of the operating button.

14. The voice recognition system according to claim 1, further comprising:
an operating button generating history storage that stores information about the operating button generated by the operating button generator, wherein
the display controller instructs the operating button generating history storage to store the information about the operating button which is generated by the operating button generator, but is not displayed on the display because the display update of the operating button is stopped, and instructs the display to display the operating button based on the information stored in the operating button generating history storage instead of the operating button which is displayed on the display when receiving an instruction signal to restart the display update of the operating button.

15. A recognition result display apparatus that displays a recognition result of a voice uttered by a user, the recognition result display apparatus comprising:
a voice acquirer that detects and acquires the voice uttered by the user;
a recognition result acquirer that transmits a voice data acquired by the voice acquirer to a voice recognition server continuously while the recognition result display apparatus is in operation, and that acquires a recognition result of the voice recognition by the server;
an operating button generator that generates an operating button with a function corresponding to the recognition result acquired by the recognition result acquirer;
a display that displays the operating button generated by the operating button generator;
a display controller that controls display content of the operating button on the display; and
an operating button display update stop/restart unit that outputs to the display controller an instruction signal that instructs to stop and restart an update of display content of the operating button depending on whether the user is about to touch the operating button displayed on the display or not, wherein
the operating button display update stop/restart unit outputs an instruction signal for stopping the update of the display content of the operating button when deciding that the user is about to touch the operating button displayed on the display; and
the display controller instructs the display to stop a display update of operating button displayed on the display when receiving the instruction signal for stopping the update of the display content of the operating button from the operating button display update stop/restart unit,
an operating button display history storage that stores a display history of the operating button displayed on the display, wherein
the display controller stores, every time the operating button is erased from the display owing to the display update of the operating button, information about the erased operating button in the operating button display history storage, and instructs the display to display the operating button stored in the operating button display history storage when scrolling of the operating button is carried out during a stop of the display update of the operating button.

16. A voice recognition system that recognizes a voice uttered by a user and causes a display device to display a recognition result, the voice recognition system comprising:
a voice recognition unit that recognizes the voice uttered by the user by referring to a voice recognition dictionary and outputs a recognition result continuously while the voice recognition system is in operation;
an operating button generator that generates an operating button with a function corresponding to the recognition result output by the voice recognition unit;
a display controller that controls display content when displaying the operating button generated by the operating button generator on the display device; and
an operating button display update stop/restart unit that outputs an instruction signal that instructs the display controller to stop and restart an update of the display content of the operating button depending on whether the user is about to touch the operating button displayed on the display device or not, wherein
the operating button display update stop/restart unit outputs an instruction signal for stopping the update of the display content of the operating button when deciding that the user is about to touch the operating button; and
the display controller instructs the display device to stop a display update of the operating button displayed on the display device when receiving the instruction signal for stopping the update of the display content of the operating button from the operating button display update stop/restart unit,
an operating button display history storage that stores a display history of the operating button displayed on the display, wherein
the display controller stores, every time the operating button is erased from the display owing to the display update of the operating button, information about the erased operating button in the operating button display history storage, and instructs the display to display the operating button stored in the operating button display history storage when scrolling of the operating button is carried out during a stop of the display update of the operating button.

\* \* \* \* \*